United States Patent
Lawrie

(10) Patent No.: US 10,229,573 B1
(45) Date of Patent: Mar. 12, 2019

(54) IMMEDIATE ALERT FOR TRACKING MOVEMENT VIA WIRELESS TETHERED DEVICES

(71) Applicant: David Lawrie, Crozet, VA (US)

(72) Inventor: David Lawrie, Crozet, VA (US)

(*) Notice: Subject to any disclaimer, the term of this patent is extended or adjusted under 35 U.S.C. 154(b) by 0 days.

(21) Appl. No.: 15/588,621

(22) Filed: May 6, 2017

(51) Int. Cl.
  G08B 7/00 (2006.01)
  H04W 4/80 (2018.01)
  G08B 21/02 (2006.01)

(52) U.S. Cl.
  CPC ........... G08B 21/0247 (2013.01); G08B 7/00 (2013.01); H04W 4/80 (2018.02)

(58) Field of Classification Search
  CPC ...... G08B 21/0247; G08B 7/00; H04W 4/008
  See application file for complete search history.

(56) References Cited

U.S. PATENT DOCUMENTS

| | | | | |
|---|---|---|---|---|
| 5,119,072 A * | 6/1992 | Hemingway | ........ | G08B 21/023 340/539.1 |
| 5,223,815 A * | 6/1993 | Rosenthal | .......... | G08B 13/1427 340/531 |
| 5,289,163 A * | 2/1994 | Perez | ................. | G08B 21/0263 340/525 |
| 5,748,087 A * | 5/1998 | Ingargiola | ............ | A43B 3/0005 340/539.1 |
| 6,243,039 B1 * | 6/2001 | Elliot | ...................... | G01S 19/16 342/357.74 |
| 6,738,628 B1 * | 5/2004 | McCall | ..................... | G01S 1/68 340/8.1 |
| 7,034,684 B2 * | 4/2006 | Boman | .............. | G08B 13/1427 340/539.11 |
| 7,382,268 B2 * | 6/2008 | Hartman | ............ | G08B 21/0269 340/539.1 |
| 7,385,513 B2 * | 6/2008 | Everest | ................ | A01K 15/023 340/573.1 |
| 7,511,627 B2 * | 3/2009 | Holoyda | ............ | G08B 21/0202 340/573.4 |
| 7,623,030 B1 * | 11/2009 | Popescu | .................. | G01S 11/02 340/539.1 |
| 7,714,709 B1 * | 5/2010 | Daniel | ..................... | A43B 3/00 340/539.1 |
| 7,843,327 B1 * | 11/2010 | DiMartino | ......... | G08B 13/1409 340/505 |

(Continued)

FOREIGN PATENT DOCUMENTS

WO WO-0219227 A1 * 3/2002 ............. G06Q 10/10

*Primary Examiner* — Joseph H Feild
*Assistant Examiner* — Rufus C Point

(57) ABSTRACT

An immediate alert notification system via wireless tethered devices is provided. The system comprises a processor, a memory, and an application stored in the memory that when executed on the processor receives a first message from a first mobile device. The system also determines that the first message indicates that a slave device is within range of a first master device associated with the first mobile device. The system also determines that the slave device is not associated with the first master device and is associated with a second master device and determines that the slave device was previously reported as lost. The system also sends a second message to a second mobile device associated with the second master device, the second message advising that the slave device has been located and further providing recovery information for the slave device.

20 Claims, 4 Drawing Sheets

(56) References Cited

U.S. PATENT DOCUMENTS

| | | | | |
|---|---|---|---|---|
| 8,232,876 B2* | 7/2012 | Derrick | | G01S 5/0027 340/539.1 |
| 8,570,168 B2* | 10/2013 | Logan | | H04Q 9/00 340/539.32 |
| 9,002,372 B2* | 4/2015 | Shakespeare | | H04W 64/00 340/539.13 |
| 9,013,314 B2* | 4/2015 | Golomb | | G08B 21/0294 340/539.15 |
| 9,615,784 B2* | 4/2017 | Fuller | | A61B 5/18 |
| 9,715,815 B2* | 7/2017 | Verma | | G01S 11/06 |
| 9,866,507 B2* | 1/2018 | Frenkel | | H04W 4/90 |
| 2002/0002633 A1* | 1/2002 | Colling, III | | G06F 9/542 719/318 |
| 2005/0128083 A1* | 6/2005 | Puzio | | G08B 13/14 340/572.1 |
| 2006/0012476 A1* | 1/2006 | Markhovsky | | G01S 13/74 340/539.32 |
| 2006/0164237 A1* | 7/2006 | Medve | | G07C 9/00111 340/539.13 |
| 2006/0238347 A1* | 10/2006 | Parkinson | | G08B 13/1436 340/572.4 |
| 2007/0205895 A1* | 9/2007 | Bergener | | G08B 13/1427 340/572.1 |
| 2008/0180271 A1* | 7/2008 | Ootsuka | | H04B 1/1027 340/12.22 |
| 2009/0122149 A1* | 5/2009 | Ishii | | H04N 1/00127 348/222.1 |
| 2009/0289844 A1* | 11/2009 | Palsgrove | | A01K 15/021 342/357.55 |
| 2010/0321196 A1* | 12/2010 | Cheng | | G08B 21/0291 340/686.6 |
| 2011/0084807 A1* | 4/2011 | Logan | | H04Q 9/00 340/10.1 |
| 2011/0210849 A1* | 9/2011 | Howard | | G08B 13/1427 340/539.32 |
| 2011/0290250 A1* | 12/2011 | Olson | | A61B 5/0836 128/203.14 |
| 2012/0005296 A1* | 1/2012 | Lint | | A61C 1/0015 709/208 |
| 2012/0169467 A1* | 7/2012 | Condra | | G06F 19/3418 340/8.1 |
| 2013/0059600 A1* | 3/2013 | Elsom-Cook | | G01S 3/20 455/456.1 |
| 2013/0063268 A1* | 3/2013 | Golomb | | G08B 21/0205 340/573.4 |
| 2013/0099920 A1* | 4/2013 | Song | | G08B 21/023 340/539.13 |
| 2014/0254808 A1* | 9/2014 | Park | | H04R 29/00 381/56 |
| 2015/0254962 A1* | 9/2015 | Lee | | G08B 21/24 340/539.32 |
| 2015/0269823 A1* | 9/2015 | Yamanishi | | G08B 21/22 340/539.11 |
| 2015/0347955 A1* | 12/2015 | Fairbanks | | G06Q 10/063116 705/7.16 |
| 2015/0356858 A1* | 12/2015 | Daoura | | G06Q 10/00 340/539.32 |
| 2015/0379859 A1* | 12/2015 | Nespolo | | G08B 21/24 340/539.32 |
| 2016/0007394 A1* | 1/2016 | Hassan | | H04W 76/12 455/450 |
| 2016/0055360 A1* | 2/2016 | Haugarth | | G06Q 30/0201 340/10.1 |
| 2016/0063847 A1* | 3/2016 | Hawkins | | G08B 21/24 340/539.11 |
| 2016/0080921 A1* | 3/2016 | Yadav | | H04W 4/023 455/404.2 |
| 2016/0150068 A1* | 5/2016 | Wada | | G08B 13/19658 455/556.1 |
| 2016/0183077 A1* | 6/2016 | Wang | | H04W 4/80 455/41.2 |
| 2016/0198285 A1* | 7/2016 | Lin | | H04L 67/12 709/209 |
| 2016/0335876 A1* | 11/2016 | Verma | | G01S 11/06 |
| 2017/0064490 A1* | 3/2017 | Jin | | H04W 4/02 |
| 2017/0171699 A1* | 6/2017 | Jin | | H04W 4/02 |
| 2017/0188405 A1* | 6/2017 | Kapoor | | H04M 1/7253 |
| 2018/0098273 A1* | 4/2018 | Gould | | H04L 12/28 |

\* cited by examiner

300

IMMEDIATE ALERT FOR TRACKING MOVEMENT VIA WIRELESS TETHERED DEVICES

CROSS REFERENCE TO RELATED APPLICATIONS

The present non-provisional application is related to provisional patent application No. 62/459,788 filed Feb. 16, 2017.

FIELD OF THE DISCLOSURE

The present disclosure is in the field of wireless monitoring devices. More particularly, the present disclosure is in the technical field of monitoring movement of wireless devices and generating alerts based on specific actions of such monitored devices.

BACKGROUND OF THE DISCLOSURE

Parents, caregivers, and others responsible for oversight of children and elderly and disabled persons must be notified quickly when such persons may not be safe. Such guardians may use mobile devices. A typical mobile device issues audible and vibratory alerts for many reasons, few of which call for immediate attention. A device user naturally becomes desensitized to such alerts and may lose a sense of urgency when most alerts are of a non-emergency and even trivial nature. When the relatively rare alert is received that does indicate an emergency, the device user may not may not respond as quickly as is necessary, increasing the risk level of a situation and exposing the user to liability for reacting slowly. Parents and caregivers, particularly with children in public places, cannot afford to lose valuable time when a potential emergency occurs.

SUMMARY OF THE DISCLOSURE

In an embodiment, a system for immediate alert for tracking movement via wireless tethered devices is provided. The system comprises a processor, a memory, and an application stored in the memory that when executed on the processor receives a first message from a first mobile device. The system also determines that the first message indicates that a slave device is within range of a first master device associated with the first mobile device. The system also determines that the slave device is not associated with the first master device and is associated with a second master device and determines that the slave device was previously reported as lost. The system also sends a second message to a second mobile device associated with the second master device, the second message advising that the slave device has been located and further providing recovery information for the slave device.

In an embodiment, a method for immediate alert for tracking movement via wireless tethered devices is provided. The method comprises a mobile device receiving an instruction to configure an associated master device to monitor a second slave device, wherein the master device is presently configured to monitor a first slave device. The method also comprises the mobile device sending a first message to the master device, the first message identifying the second slave device and configuring at least settings on the master device to begin processing wireless signals broadcasted from the second slave device and for alerts to be emitted by the master device upon certain movements of the second slave device. The method also comprises the mobile device receiving a second message from the master device confirming receipt of the first message and confirming implementation and storage of the settings.

In an embodiment, a system for immediate alert for tracking movement via wireless tethered devices is provided. The system comprises a processor, a memory, and an application stored in the memory that when executed on the processor receives a first message from a first mobile device and determines that the first message indicates that a slave device is within range of a first master device associated with the first mobile device. The system also determines that the slave device is not associated with the first master device and is associated with a second master device. The system also determines that the slave device was previously reported as lost. The system also sends a second message to a second mobile device associated with the second master device, the second message advising that the slave device has been located and further providing recovery information for the slave device.

Systems and methods provide that an alert is generated on the master device carried by a parent or other caregiver. An alert is not generated on a mobile device that may coincidentally be carried by the parent or caregiver. The mobile device may provide only a single noisy channel for alerts and is not an ideal means for providing critical alerts such as those associated with an errant slave device. The master device can connect to and monitor more than one slave device. Each slave device may be customized with different settings via the mobile application executing on the mobile device such that the user of the master device can determine which of two or more slave devices is presently errant. A master device can in stealth (without the master device user's knowledge) monitor other slave devices (those with different master devices) and transmit messages that enable errant slave devices to be located and recovered.

DETAILED DESCRIPTION OF THE INVENTION

Figure 1:
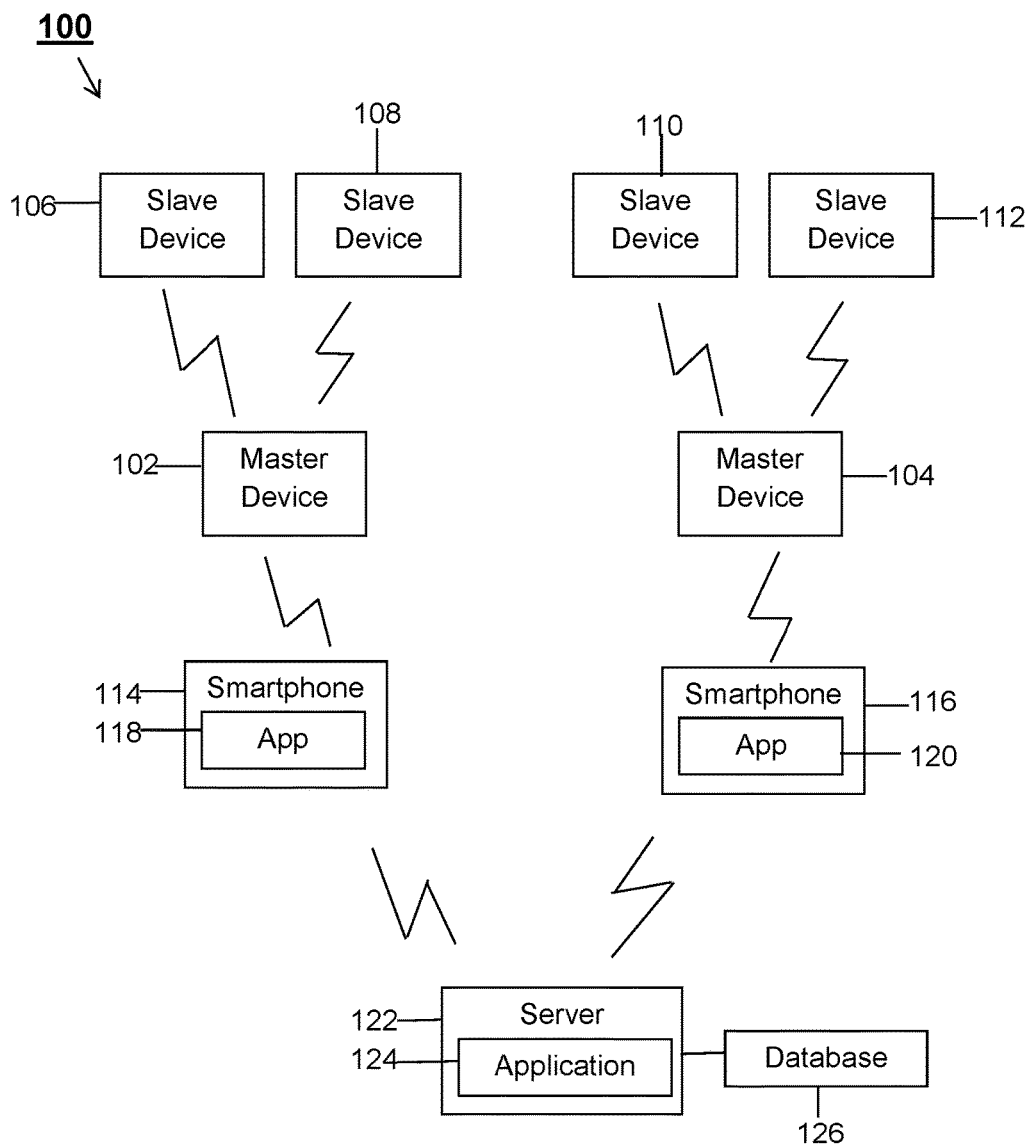
FIG. 1 depicts a diagram of a system for immediate alert for tracking movement via wireless tethered devices in accordance with an embodiment of the present disclosure.

Systems and methods described herein provide for receiving immediate alerts for tracking movement via wireless tethered devices. Perceptible vibratory and/or audible prompts are emitted on occurrence of certain events. A master device and a slave device may be configured such that when certain actions, particularly movements, of the slave device are detected by the master device, the master device generates an alert. An individual carrying the master device receives the alert and may then locate the individual, for example an errant child or elder person, carrying the slave device.

The interactions provided herein between master device, slave device, and other components may be directed solely to alerting a master device user to potentially troublesome movements of a slave device user. When the master device receives an alert, the user of the master device in nearly all cases knows that the alert can only mean that the slave device has moved beyond a predetermined range or has been located after becoming lost. The master device does not typically receive messages other than such alerts.

The slave device broadcasts low energy Bluetooth or other types of wireless signals which are received and analyzed by the master device. When signal strength of the received signals is detected by the master device to be less than a configured threshold, this event may indicate that the slave device has moved beyond an allowed distance from the master device. Based on such detection, the master device generates a vibratory and/or audible alert for the individual carrying the master device. The master device carrier may then be motivated to physically locate the carrier of the slave device. Practical ranges for such coverage may be as much as 500 meters for outdoor use and less for indoor use.

The slave device may be attached to or worn by a young child or elderly and/or disabled person. The master device may be attached to or worn by an adult, for example a parent, who is responsible for the child. In a public place, the parent may seek to assure that the child does not venture far from the parent.

In an example, a parent wearing a master device may be caring for a child. The child has a slave device attached to his/her clothing. The child ventures beyond a configured range, received signal strength drops below the configured threshold, and the parent is alerted on his/her master device.

In another example, a man has a slave device attached to his briefcase. The man accidentally leaves the briefcase at a coffee shop and is alerted on the master device he is carrying as soon as he drives out of the parking lot of the coffee shop.

An imperative of the present disclosure is the instant alert that is generated on the master device. While other applications may be solely focused on finding items/people once the user becomes aware they have been lost, this comes at the expense of reaction time between the item/person becoming lost and the user's awareness of the lost event. The immediate alert generated on the master device provided herein and the master device user's knowledge that this alert is specific to a lost slave device. No other competing alert may promote a fast reaction time by the master device user to a potentially life threatening event.

In a further example, if a child wearing the slave device wanders out of the house and into a public area, for example near a roadway, it may be a situation in which literally seconds may count. The master device (which receives no other competing notification events in the manner that mobile telephones receive alerts for many types of events, many not urgent and some even trivial) is solely charged with alerting the master device user that the slave device user (the child) has wandered astray. In this manner, there is an immediate call to action by the mobile device user before an accident can occur.

Systems provided herein also optionally include an application or app that executes on a smartphone. The app may allow for configuration of both the master and slave devices. Configurable items include signals to be broadcasted by the slave device, signal strength level for the aforementioned threshold associated with alerts, slave identity (naming), and the type of alert(s) to be generated on the master device.

The master device and the slave device may be programmed with default settings such that configuration using the app on the smartphone is not necessary. The smartphone need not be carried by the user of the master device or at all. In an embodiment, the app and smartphone are entirely optional components and the master and slave devices may function without the app and smartphone.

In embodiments, movements of two or more slave devices may similarly be monitored by a single master device. Slave devices may be configured to broadcast separate and different low-energy Bluetooth signals. In some embodiments, wireless signals other than low-energy Bluetooth signals may be used. A master device configured to work with two or more slave devices recognizes each of the devices separately and identifies which of the slave devices may have moved outside of safe range. Separate types of alerts are emitted by the master device for each slave device.

Each slave device may have a unique identifier that is stored by a server and an associated application in a database. Such a unique identifier may be useful if a particular slave device becomes "lost" wherein the corresponding master device loses and does not regain contact with the slave device. In such an instance, the master device may report the slave device as lost. The master device may in some embodiments contain functionality such that the master device user may generate a message for transmission via its associated smartphone to the server regarding the lost status of the slave device. In other embodiments, the master device user may originate such a message from a device other than the master device, such as via a voice or data connection.

The server, based on receipt of communication originated by the master device, designates the slave device as lost. The application executing on the server makes an entry in the database noting the slave device having status of lost. When the lost slave device's continued beaconing is detected by a second master device unrelated to the lost slave device, the second master device reports this event via its associated smartphone which is received by the server. The application determines from consulting the database that the reported errant slave device has been designated as lost. The application sends notification to the smartphone associated with the master device responsible for the lost slave device. The notification advises that the lost slave device has been located and provides information about how the lost slave device may be recovered.

Separate notifications for the master device user's benefit may be sent via at least one of electronic mail, via an SMS or MMS (i.e. text) message, and via another messaging method to the master device user. The content of the separate notification(s) may be data which will be helpful for the master device user to locate the user of the errant slave device. Examples of information contained in such separate notification(s) include time and date and latitude and longitude coordinates of the last detection of the slave device. This is message content which the master device user could not consume based on the physical structure of the master device. This message content would thus need to be viewed and/or heard either on the master device user's own smartphone, computer or other device with appropriate functionality.

Turning to the figures, FIG. 1 is a block diagram of a system of immediate alert for tracking movement via wireless tethered devices. FIG. 1 depicts components of a system 100. System 100 comprises master devices 102, 104, slave devices 106, 108, 110, 112, smartphones 114, 116, apps 118, 120, a server 122, an application 124, and a database 126.

Discussion of the master device 102 applies to the master device 104 unless otherwise noted. The same holds true for the slave devices 106, 108, 110, 112, smartphones 114, 116, and apps 118, 120, such that, for example, discussion of the slave device 110 also applies to the slave devices 106, 108, 112 unless otherwise noted.

For discussion and illustration purposes, two slave devices 106, 108 and two slave devices 110, 112 each are depicted as associated with the master device 102 and the master device 104, respectively, in FIG. 1. In embodiments, only a single slave device 106 or more than two slave devices 106 may be simultaneously tracked as described herein.

Figure 2:
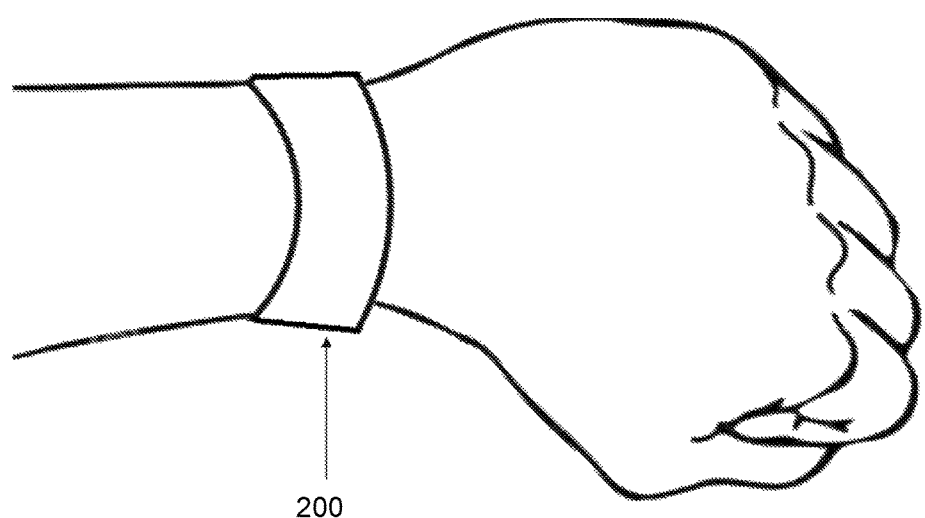
FIG. 2 is a diagram of a system for immediate alert for tracking movement via wireless tethered devices in accordance with an embodiment of the present disclosure.

The master device 102 is carried by a person who may wish to monitor movements of a wearer of the slave device 106. The master device 102 is wearable by the user. The master device 102 may receive configuration information from the smartphone 114 regarding signals to be broadcasted by the slave device 106, signal strength level for the aforementioned threshold associated with alerts, and the type of alert(s) to be generated. A sample master device 102 is depicted in FIG. 2.

The master device 102 may be a wearable device and wrist strap based. The master device 102 may be waterproof and may be sturdy enough for outdoor use. The master device 102 may be programmable and customizable via Bluetooth or other technology from the app 118 executing on the smartphone 114. The app 118 allows for control of many aspects of the master device 102 including alarm settings and sensitivity levels. The master device 102 is rechargeable via wireless charging.

Figure 3:
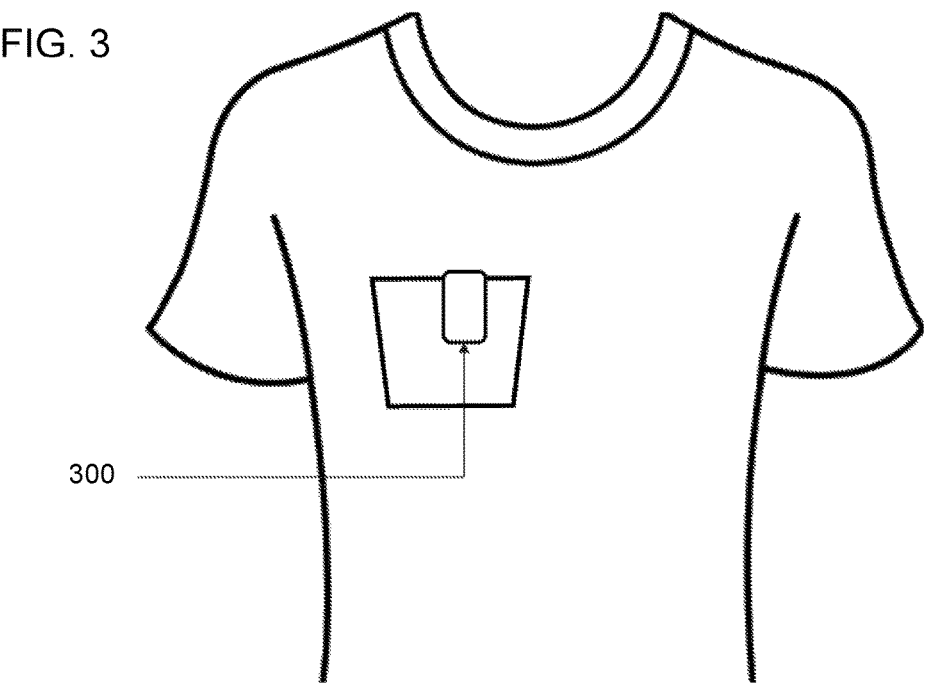
FIG. 3 is a diagram of a system for immediate alert for tracking movement via wireless tethered devices in accordance with an embodiment of the present disclosure.

The slave device 106 may be attached to the clothing of the user of the slave device 106, for example a child, elder person, or disabled person. A sample slave device 106 is depicted in FIG. 3. The slave device 106 may be in a tag or tile format permitting the slave device 106 to be clipped onto clothing. The slave device 106 may not have a power button so that a child or other person wearing the slave device 106 may not accidentally or intentionally power off the slave device 106 thus making the slave device 106 not trackable. The slave device 106 may have a multi-color LED to signal different events. The slave device 106 may be waterproof. The slave device 106 may be rechargeable via wireless charging.

As noted, the slave device 106 constantly broadcasts low energy Bluetooth or other type of wireless signals. The master device 102 is configured to recognize the signals as having been received from the slave device 106. The master device 102 calculates Received Signal Strength Indicator (RSSI) values associated with the received wireless signals to analyze strength of the received signals.

The master device 102 is preconfigured to generate a vibratory and/or audible alert when signal strength received via low energy Bluetooth or other selected wireless technology drops below a predetermined threshold or exhibits another predetermined characteristic. As noted, such event may indicate that the slave device 106 has moved beyond a distance considered safe by the user of the master device 102. Upon receiving such alert, the user of the master device 102 may take steps to locate the errant child or other user of the slave device 106.

When two or more slave devices 106, 108 are tracked by the master device 102, the slave devices 106, 108 may generate wireless signals that may be separately recognizable by the master device 102. Separately recognizable alerts are also emitted by the master device 102. The user of the master device 102 may thus be enabled to determine which of the slave devices 106, 108 has moved beyond a safe physical range.

The smartphones 114, 116 and the apps 118, 120 executing thereon, respectively, are used to configure the master devices 102, 104, respectively, as described above. As noted, the smartphone 114 and the app 118 are optional components. The master device 102 and the slave device 106 can operate without the involvement or even existence of the smartphone 114 and app 118.

In an embodiment, the smartphone 114 may receive messages from the server 122 about location of the slave device 106 that was previously reported as having been lost. In an example illustrating this embodiment, the master device 102 and its associated slave device 106 become separated for some reason. The user of the master device 102 is then unable to physically locate the user of the slave device 106. The master device 102 reports through its associated smartphone 114 to the server 122 that the slave device 106 is lost. The application 124 executing on the server 122 accesses the database 126 and marks the status of the slave device 106 as "lost."

In this embodiment, so long as the lost slave device 106 has adequate power, the slave device 106 continues to broadcast beaconing of low energy Bluetooth signals even though it has moved well beyond safe range from its associated master device 102. In this embodiment and in this example, the lost slave device 106 may come within the range of the master device 104 with which the slave device 106 has no previous connection or relationship. The master device 104 may, while receiving signals from its own slave device 110 and/or slave device 112, also pick up signals from the lost slave device 106.

The master device 104 recognizes that these new signals did not originate from either of its own associated slave devices 110, 112. The master device 104 reports the unknown signals via its own smartphone 116 to the server 122. The application 124 executing thereon matches information generated from the signals of the lost slave device 106 with its stored information regarding the slave device 106 having a "lost" status. The application 124 determines, based on such matching, that the slave device 106 previously reported as lost has been located.

The server 122 then notifies the smartphone 114 associated with the slave device 106 that the slave device 106 has been found. The smartphone 114 sends signaling to the master device 102 alerting the user of this event. The information sent by the server 122 to the smartphone 114 may include the location of the found slave device 106 such that the user of the master device 102 may recover the slave device 106.

It should be noted that in the above embodiment involving the lost slave device 106 first making contact with the master device 104 with which it is not associated, the user(s) of the master device 104 and its associated smartphone 116 is/are not aware of or provided notification about these events. The communications associated with these events and the user of the master device 102 take place without the user of the master device 104 and its associated smartphone 116 receiving any information, thus shielding the user of the slave device 106 from risk of predatory behavior by the user of the master device 104 or others.

As noted, the master device 102 can simultaneously receive Bluetooth signals from two or more slave devices 106, 108. Configuration of such an arrangement can be done using the smartphone 114 and app 118 executing thereon which are associated with the master device 102. In embodiments, the master device 102 can start out receiving signals from and monitoring slave device 106 and subsequently take addition of slave device 108 based on actions of the smartphone 114.

Figure 4:
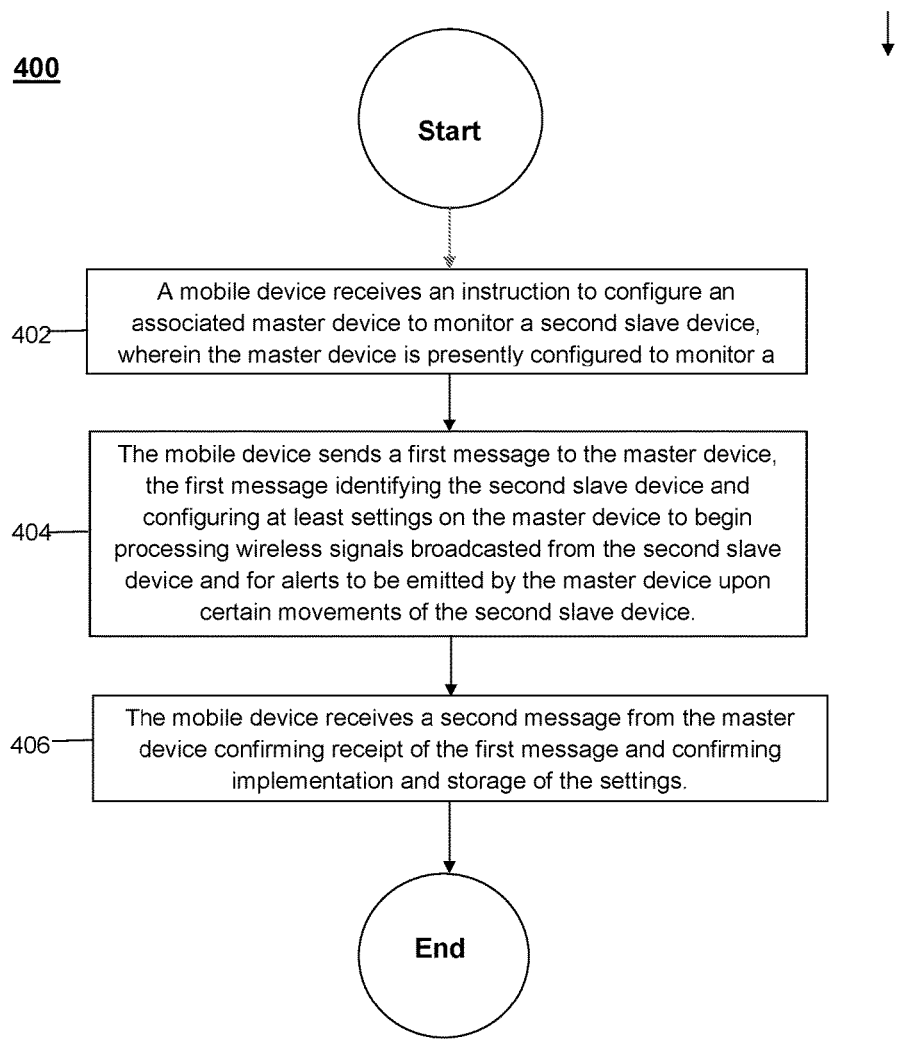
FIG. 4 is a flowchart of a method for immediate alert for tracking movement via wireless tethered devices in accordance with an embodiment of the present disclosure.

FIG. 4 is a flowchart of a method 400 for immediate alert for tracking movement via wireless tethered devices in accordance with an embodiment of the present disclosure. Components executing the steps of the method 400 correspond to components provided by the system 100.

Beginning at block 402, a mobile device receives an instruction to configure an associated master device to monitor a second slave device, wherein the master device is presently configured to monitor a first slave device. At block 404, the mobile device sends a first message to the master device, the first message identifying the second slave device and configuring at least settings on the master device to begin processing wireless signals broadcasted from the second slave device and for alerts to be emitted by the master device upon certain movements of the second slave device. At block 406, the mobile device receives a second message from the master device confirming receipt of the first message and confirming implementation and storage of the settings. The method 400 terminates thereafter.

What is claimed is:

1. An immediate alert notification system via wireless tethered devices, comprising:
   a processor:
   a memory: and
   an application stored in the memory that when executed on the processor:
   receives a first message from a first mobile device,
   determines that the first message indicates that a slave device is within range of a first master device associated with the first mobile device,
   determines that the slave device is not associated with the first master device and is associated with a second master device,
   determines that the slave device was previously reported as lost, and
   sends a second message to a second mobile device associated with the second master device, the second message advising that the slave device has been located and further providing recovery information for the slave device,
   wherein the system further comprises:
   the slave device that broadcasts wireless signals; and
   the second master device that:
   receives the wireless signals,
   analyzes at least signal strength of the wireless signals,
   determines, based on the analyzed at least signal strength, that signal strength is below a predetermined threshold, and
   activates an alert, based on the determination;
   wherein the second master device passively monitors received wireless signals and does not transmit signals to the slave device.

2. The system of claim 1, wherein the slave device is carried by a first user and the second master device is carried by a second user and wherein the system enables notification of certain movements of the first user.

3. The system of claim 1, wherein the alert indicates that the slave device has been moved beyond a predetermined distance from the second master device.

4. The system of claim 1, wherein alerts emitted by the second master device comprise at least one of vibratory alerts and audible alerts.

5. The system of claim 1,
   wherein the second mobile device sends an alert to the second master device indicating that the slave device has been located,
   wherein the first master device silently receives signaling from the slave device and silently sends the first message to the first mobile device,
   wherein the application additionally makes the recovery information available by at least one of voice and Internet access, and
   wherein via at least one of the voice and Internet access an authorized party at least one of initiates contact with and receives contact from at least the application and receives the recovery information.

6. The system of claim 1, wherein the system calculates Received Signal Strength Indicator (RSSI) values associated with the wireless signals in analysis of signal strength.

7. The system of claim 1, further comprising a third portable device and an application executing thereon that configure at least one of signal strength levels, the predetermined threshold, and the type(s) of alert(s).

8. The system of claim 7, wherein the third portable device is a smartphone.

9. The system of claim 7, wherein the third portable device configures the second portable device to monitor wireless signals broadcasted by portable devices in addition to the first portable device.

10. An immediate alert notification system via wireless tethered devices, comprising:
    a processor:
    a memory; and
    an application stored in the memory that when executed on the processor:
    receives a first message from a first mobile device,
    determines that the first message indicates that a slave device is within range of a first master device associated with the first mobile device,
    determines that the slave device is not associated with the first master device and is associated with a second master device,
    determines that the slave device was previously reported as lost, and
    sends a second message to a second mobile device associated with the second master device, the second message advising that the slave device has been located and further providing recovery information for the slave device,
    wherein the first mobile device further receives an instruction to configure the first master device to monitor a second slave device, wherein the first master device is presently configured to monitor a third slave device;
    the mobile device sends a third message to the first master device, the third message identifying the second slave device and configuring at least settings on the first master device to process wireless signals broadcasted from the second slave device and for alerts to be emitted by the first master device upon certain movements of the second slave device in addition to movements of the third slave device as previously configured; and
    the mobile device receiving a fourth message from the first master device confirming receipt of the third message and confirming implementation and storage of the settings,
    wherein the first master device passively monitors received wireless signals from the second slave device and the third slave device and does not transmit signals to the second and third slave devices, and wherein the first and second mobile devices are smartphones.

11. The system of claim 10, wherein based on the configuration, the first master device simultaneously measures signal strength of Bluetooth low energy signals broadcasted by the third slave device and the second slave device.

12. The system method of claim 10, wherein alerts emitted by the first master device associated with movements of the first third slave device differ perceptibly from alerts emitted by the first master device associated with movements of the second slave device.

13. The system of claim 10,
wherein the second mobile device sends an alert to the second master device indicating that the slave device has been located,
wherein the first master device silently receives signaling from the slave device and silently sends the first message to the first mobile device,
wherein the application additionally makes the recovery information available by at least one of voice and Internet access, and wherein via at least one of the voice and Internet access an authorized party at least one of initiates contact with and receives contact from at least the application and receives the recovery information.

14. The system of claim 10, wherein the first master device calculates Received Signal Strength Indicator (RSSI) values associated with the wireless signals in analysis of signal strength.

15. An immediate alert notification system via wireless tethered devices, comprising:
a processor;
a memory; and
an application stored in the memory that when executed on the processor:
receives a first message from a first mobile device,
determines that the first message indicates that a slave device is within range of a first master device associated with the first mobile device,
determines that the slave device is not associated with the first master device and is associated with a second master device,
determines that the slave device was previously reported as lost, and
sends a second message to a second mobile device associated with the second master device, the second message advising that the slave device has been located and further providing recovery information for the slave device.

16. The system of claim 15, wherein the second mobile device sends an alert to the second master device indicating that the slave device has been located.

17. The system of claim 15, wherein the range is one of 100 feet, 300 feet, and 500 meters.

18. The system of claim 15, wherein the first master device silently receives signaling from the slave device and silently sends the first message to the first mobile device.

19. The system of claim 15, wherein the application additionally makes the recovery information available by at least one of voice and Internet access.

20. The system of claim 19, wherein via at least one of the voice and Internet access an authorized party at least one of initiates contact with and receives contact from at least the application and receives the recovery information.

* * * * *